(12) United States Patent
Arkko et al.

(10) Patent No.: US 9,888,453 B2
(45) Date of Patent: Feb. 6, 2018

(54) INTEGRATED PAGING TECHNIQUE

(71) Applicant: TELEFONAKTIEBOLAGET L M ERICSSON (PUBL), Stockholm (SE)

(72) Inventors: Jari Arkko, Kauniainen (FI); Ari Keränen, Helsinki (FI); Anna Larmo, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 8 days.

(21) Appl. No.: 14/420,689

(22) PCT Filed: Aug. 23, 2013

(86) PCT No.: PCT/SE2013/050992
§ 371 (c)(1),
(2) Date: Feb. 10, 2015

(87) PCT Pub. No.: WO2014/031073
PCT Pub. Date: Feb. 27, 2014

(65) Prior Publication Data
US 2015/0223199 A1  Aug. 6, 2015

Related U.S. Application Data

(60) Provisional application No. 61/692,825, filed on Aug. 24, 2012.

(51) Int. Cl.
*H04W 68/02* (2009.01)
*H04W 4/00* (2009.01)
*H04W 52/02* (2009.01)
*H04W 68/00* (2009.01)

(52) U.S. Cl.
CPC ........... *H04W 68/02* (2013.01); *H04W 4/005* (2013.01); *H04W 52/0225* (2013.01); *H04W 68/005* (2013.01); *Y02B 60/50* (2013.01)

(58) Field of Classification Search
CPC ............. H04W 4/005; H04W 52/0225; H04W 68/005; H04W 68/02; Y02B 60/50
USPC ................ 455/418, 420, 458, 412.2, 59, 61; 370/253, 349
See application file for complete search history.

(56) References Cited

U.S. PATENT DOCUMENTS

| | | | | |
|---|---|---|---|---|
| 2003/0233587 A1* | 12/2003 | Sanu | .......................... | G06F 1/24 713/300 |
| 2007/0254677 A1 | 11/2007 | Venkitaraman | | |
| 2010/0100761 A1* | 4/2010 | Carlson | ............... | H04L 12/6418 714/4.1 |
| 2010/0255859 A1* | 10/2010 | Park | .................... | H04W 68/025 455/458 |
| 2011/0087791 A1 | 4/2011 | George | | |

(Continued)

*Primary Examiner* — Kamran Afshar
*Assistant Examiner* — Farid Seyedvosoghi

(57) ABSTRACT

The present disclosure relates to a method performed in a network node in a communication network. The method comprises receiving instructions to monitor whether a first service is sending a message intended for a radio device. The method also comprises monitoring the first service, in accordance with the received instructions, in order to obtain information relating to whether the service is sending a message intended for the radio device. The method also comprises processing the obtained information such that a decision can be made whether to wake up the radio device. The present disclosure also relates to a network node and to a radio device.

18 Claims, 3 Drawing Sheets

(56) References Cited

U.S. PATENT DOCUMENTS

2012/0064932 A1    3/2012  Lim
2012/0331323 A1*  12/2012  Choi ................. G06F 1/3203
                                                        713/323
2013/0184013 A1*  7/2013  Chao ................. H04W 68/02
                                                        455/458

\* cited by examiner

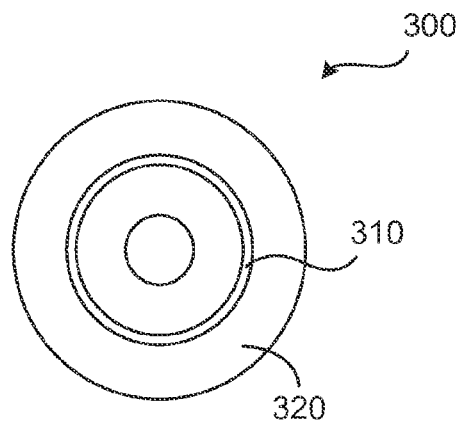
Fig. 3
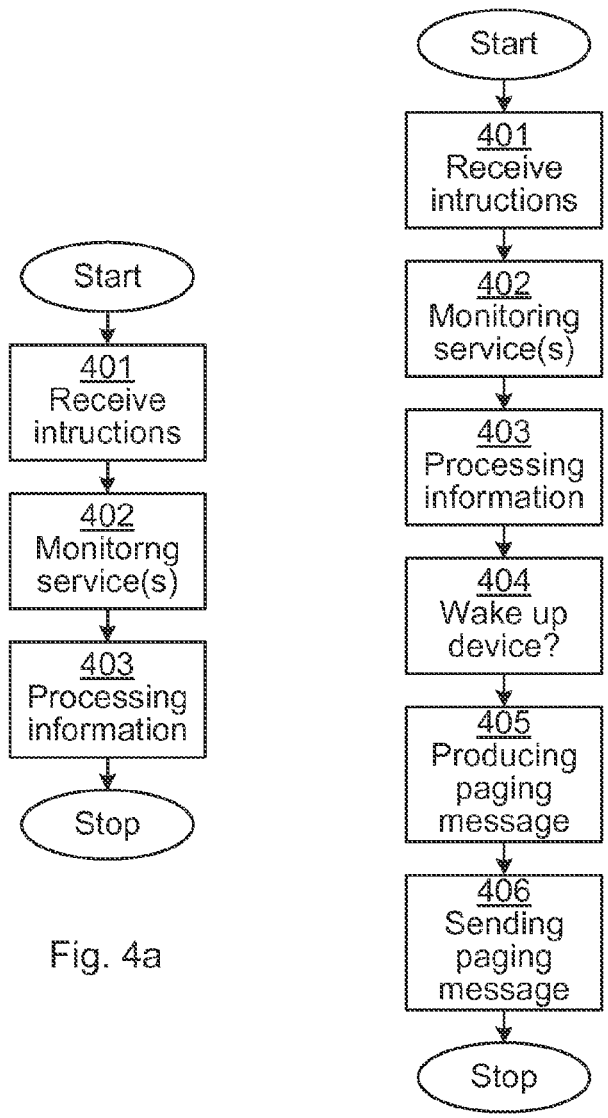
Fig. 4a
Fig. 4b

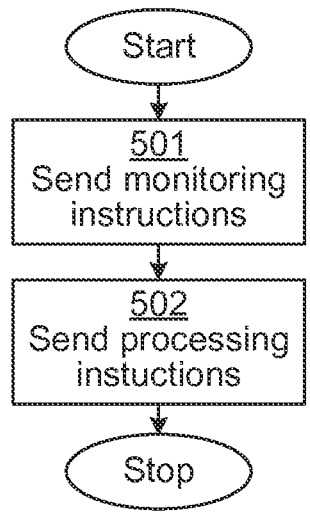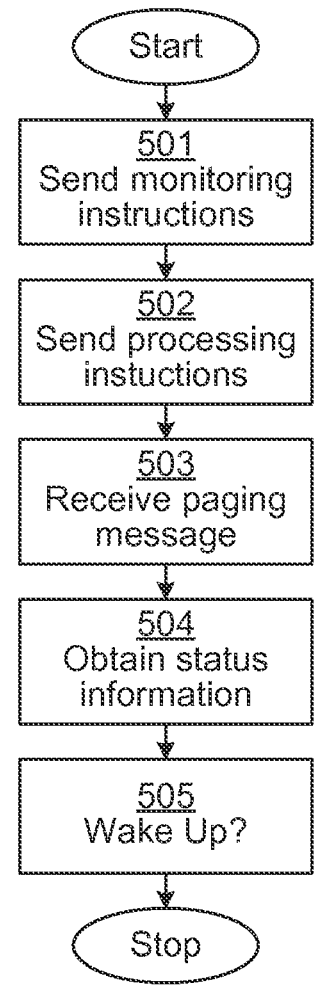
Fig. 5a
Fig. 5b
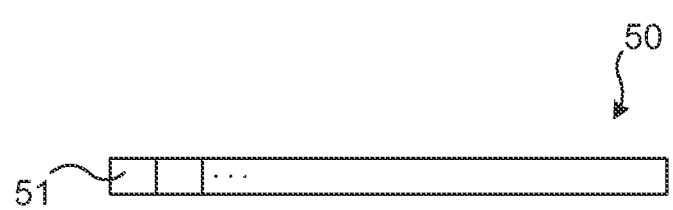
Fig. 6

INTEGRATED PAGING TECHNIQUE

This application is a 371 of international application PCT/SE2013/050992, filed Aug. 23, 2013, which claims the benefit of US Provisional Application No. 61/692,825, filed Aug. 24, 2012, the disclosures of which are fully incorporated herein by reference.

TECHNICAL FIELD

The present disclosure relates to methods and a node in a radio communication network, as well as to a radio device in such a radio communication network, for deciding whether to wake up the radio device.

BACKGROUND

Today mobile terminals often poll multiple services by sending packets to these services and expecting an answer. Does this terminal have e-mail waiting? Are there incoming instant messaging (IM) messages? Is there an update to a web page that the device is interested in?

This consumes a lot of resources from the network, and has been the cause of major network capacity problems, e.g., as smartphones were introduced. Moreover, having to frequently send and receive data to and from the network requires the terminal to be in active state most of the time which increases the energy consumption and results in short standby time.

There are only limited mechanisms for the network to inform the terminal that it has some traffic. One of these mechanisms is that the network provides ability to page a device that has some incoming IP packets. Paging is essentially carried out by transmitting the identifiers of the terminals to be paged over a specific paging channel. As an example, Long Term Evolution (LTE) networks employ the following techniques (see $3^{rd}$ Generation Partnership Project (3GPP) Technical Specification (TS) 36.331):

The paging channel is divided into time-based paging occasions and a numeric algorithm based on the identities of the terminals is used to determine at which occasion a particular terminal shall be paged at (i.e., the paging group). The terminal needs to monitor the paging only during its paging slot. This limits the amount of listening a terminal needs to do, thus improving battery lifetime.

If a terminal should be paged, in the occasion for this terminal, the system transmits its S-Temporary Mobile Subscriber Identity (S-TMSI, temporary, unique identifier) or sometimes IMSI (International Mobile Subscriber Identity). If multiple terminals need to be paged in the same slot, their S-TMSI (or IMSI) values are listed (up to the length of the slot, maximum of 16 terminals in LTE 3GPP Release 10).

In general, existing paging mechanisms can be divided into the following groups:
1. Agreeing on a specific time slot or channel where devices should listen for incoming messages for them.
2. Multi-stage mechanisms where the devices are not given a message directly, but only an indication that a message is coming and possibly some further information at which time, on which channel, etc. either the message or some further instructions can be received.
3. Designating specific devices to listen for a message at a specific time slot or channel.
4. Identifying specific devices in a message by their identifiers.
5. Identifying groups of devices in a message by some partial identifier, e.g., the first N bits of an M bit identifier (M>N).
6. Identifying groups of devices with some dynamic identifier that has to be agreed between the network and the devices.
7. Using a Bloom filter or some other construct to create a space-efficient bit pattern that identifies which nodes need to woken up.

Nevertheless, the paging mechanism is only applicable when there is a peer that has sent a packet to the terminal.

Another related mechanism includes the use of a common transport channel and an intermediate server, to consolidate polling of different services. This is used by certain modern smartphone platforms. The idea is that the phone communicates over one Transmission Control Protocol (TCP) or User Datagram Protocol (UDP) session with a server in the phone manufacturer's network, and that server then contacts the necessary other services. This reduces the amount of packets needed to be sent from the mobile terminal.

SUMMARY

It has been realised that there are problems with the existing paging protocol. Paging is a necessary function as it is general for any communication. However, it forces a particular communication pattern, namely something that results in a packet sent to the radio device. This can be either:

1. A radio device sending a request and later getting back a response.
2. An unsolicited message sent from somewhere in the network to the radio device.

The latter only works if there is true end-to-end connectivity to the device, e.g., through unfiltered Internet Protocol version (IPv) 6 or using some network address translation (NAT)/firewall hole punching mechanisms. In practice, end-to-end communications cannot be expected in IPv4. Since some firewalls are likely to exist even in IPv6, also in IPv6 the radio device has to send either application requests or firewall state keep-alive packets.

This traffic may be undesirable, because it adds no value, and has to be constantly sent even when there is no actual content or message to be delivered. The shared transport channel solution and intermediate nodes in the network ease the problems somewhat, by reducing the number of requests that have to be sent. However, some requests still have to be sent and a radio device needs to consume resources to keep the return channel alive.

In summary, the paging and shared transport solutions have at least the following drawbacks:
The devices may have to send requests or keep-alive messages, even when there is nothing to communicate.
Sending packets is more expensive in terms of energy usage than receiving packets.
The devices may have to receive packets destined to them, without any knowledge of what the incoming packet may contain. For instance, a device may wish to receive traffic type "a" immediately, but check traffic type "b" only once an hour.

These issues are particularly difficult for machine-to-machine (M2M) nodes (e.g. sensors communicating automatically with a software application), when nodes may have to stay on with a battery for long periods of time, preferably for months, years, or even beyond a decade. Imagine e.g. a million small sensors placed in the wilderness for measuring climate parameters or the like, where the power source (battery) is not easily recharged. M2M devices also typically support wildly varying applications, some requiring emergency-level urgency (e.g., fire alarms) and some requiring a very infrequent and low-priority communications (e.g., environmental measurements).

It is an objective of the present disclosure to provide an improved paging mechanism where the energy consumption of the radio devices, e.g. user equipments (UEs), mobile or stationary terminals or any other device configured for wireless communication, is reduced.

According to the present disclosure, an integrated service paging system can be constructed by using an intermediary server or node in a communication network and optionally an extended paging message signalling mechanism.

Each radio device (here exemplified by a radio device) can request the intermediary to perform polling on its behalf. The results of the polling can be made available in the paging messages, e.g., as a bit pattern ("no IM messages, an e-mail message waiting, no firmware updates, no management commands" etc.). This enables the device to decide whether it needs to act on the input immediately, or only after some time. A significant power saving can be achieved, if the device can deal with only urgent messages immediately, but postpone all other traffic to be done, e.g., once per hour or once per day.

According to an aspect of the present disclosure, there is provided a method of a network node of a communication network. The method comprises receiving instructions to monitor whether a first service is sending a message intended for a radio device. Optionally, the method also comprises receiving instructions to monitor whether a second service is sending a message intended for the radio device. The method also comprises monitoring the first service, and the second service if applicable, in accordance with the received instructions, in order to obtain information relating to whether the service(s) is sending a message intended for the radio device. The method also comprises processing the obtained information such that a decision can be made whether to wake up the radio device (e.g. get the radio device from an idle state to an active state).

According to another aspect of the present disclosure, there is provided a network node of a communication network. The node comprises a processor, and a storage unit storing instructions, e.g. computer-executable components, that when executed by the processor cause the network node to monitor a first and, optionally, a second service for whether said first and/or second service is sending a message intended for a radio device, in order to obtain information relating to whether the service(s) is sending a message intended for the radio device. The instructions also cause the network node to process the obtained information such that a decision can be made whether to wake up the radio device. The monitoring is performed as a result of the network node having received instructions to monitor whether the first service is sending a message intended for the radio device and, optionally, having received instructions to monitor whether the second service is sending a message intended for the radio device.

The network node may be configured for performing an embodiment of the aspect of the method of a network node. The node may e.g. be a server, such as an intermediary server as mentioned herein.

The message intended for the radio device may e.g. be a request, or a data message.

According to another aspect of the present disclosure, there is provided a computer program product comprising computer-executable components for causing an embodiment of the network node to perform an embodiment of the method of a network node, when the computer-executable components are run on a processor comprised in the network node.

According to another aspect of the present disclosure, there is provided a computer program for a network node comprising computer program code which is able to, when run on a processor of an embodiment of the network node, cause the node to perform an embodiment of the method of a network node.

According to another aspect of the present disclosure, there is provided a computer program product comprising an embodiment of the computer program for a network node and a computer readable means on which the computer program is stored.

In some embodiments, the instructions to monitor the service(s) are received from the radio device.

According to another aspect of the present disclosure, there is provided a method of a radio device. The method comprises sending, to a network node, instructions to monitor whether a first service is sending a message intended for the radio device. Optionally, the method also comprises sending, to the network node, instructions to monitor whether a second service is sending a message intended for the radio device. In accordance with the instructions, the monitoring is in order to obtain information relating to whether the service(s) is sending a message intended for the radio device. The method also comprises sending, to the network node, instructions for processing the obtained information such that a decision can be made whether to wake up the radio device.

According to another aspect of the present disclosure, there is provided a radio device. The device comprises a processor, and a storage unit storing instructions, e.g. computer-executable components, that, when executed by the processor, cause the device to send, to a network node, instructions to monitor whether a first service is sending a message intended for the radio device, and, optionally, to send, to the network node, instructions to monitor whether a second service is sending a message intended for the radio device, in order to obtain information relating to whether the service(s) is sending a message intended for the radio device. The instructions of the storage unit also cause the device to send, to the network node, instructions for processing the obtained information such that a decision can be made whether to wake up the radio device.

The radio device may be configured for performing an embodiment of the aspect of the method of a radio device.

The processing instructions are in some embodiments combined with the monitoring instructions, or the processing instructions may be implied by the monitoring instructions.

According to another aspect of the present disclosure, there is provided a computer program product comprising computer-executable components for causing an embodiment of the radio device to perform an embodiment of the method of a radio device, when the computer-executable components are run on a processor comprised in the radio device.

According to another aspect of the present disclosure, there is provided a computer program for a radio device comprising computer program code which is able to, when run on a processor of an embodiment of the radio device, cause the radio device to perform an embodiment of the method of a radio device.

According to another aspect of the present disclosure, there is provided a computer program product comprising an embodiment of the computer program for a radio device and a computer readable means on which the computer program is stored.

According to another aspect of the present disclosure, there is provided an extended radio paging message comprising bits dedicated to indicate whether a first service (and/or, optionally, a second service) to which the bits are dedicated requests to send a message to a radio device. The extended paging message may be constructed in a radio base station, such as an evolved Node B (eNB), with information coming from the Mobility Management Entity (MME). The network node of the present disclosure in this case informs the MME and/or eNB when there are packets/messages available for the radio device from the service(s). Thus, the network node may be configured to provide information, based on which information the extended paging message can be formed and sent to the radio device over a radio interface.

Embodiments of the radio device may be configured for receiving and processing an embodiment of the extended radio paging message. Thus, the radio device may be configured to, based on the extended paging message, decide whether any message from a service is important enough for the device to wake up and receive the message. When deciding whether to wake up, obtained information about a status of the radio device may be considered and the deciding whether to wake up the radio device may be based also on such status information. Such a status of the radio device may e.g. include the remaining stored battery energy of the device and/or the remaining free storage space in the radio device. Embodiments of the network node may be configured for producing and sending an embodiment of the extended radio paging message.

In some embodiments the decision whether to wake up the radio device can be made by the network node. In some embodiments the decision whether to wake up the radio device can be made by the radio device.

In some embodiments, the network node (herein also called an intermediary server) is part of a mobile telecommunication operator network, and not a node provided by a service provider. The node may e.g. be comprised in or otherwise associated with a network node of the operator network. In some embodiments the node may e.g. be associated with or comprised in an MME or a device connection platform (DCP) node, or in any CN node, or in a base station or other Radio Access Network (RAN) node.

In some embodiments, the network node is configured for deciding whether to wake up the radio device, based on whether the first and/or second service requests to send a message to the radio device.

Embodiments of the present disclosure reduce the number of messages that e.g. an M2M device needs to send and/or receive. In embodiments with a modest bit size increase in paging messages (e.g., an increase of 2-10 bits to increase the total bit size of the paging message, e.g. from 10 to 14 bits per radio device), much more information can be provided. This information is useful for the radio device to decide when it deals with the information sent to it. By delaying non-critical information, the radio device can employ limited battery power more efficiently.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 3 is a schematic illustration of an embodiment of a computer program product of the present disclosure.

FIG. 4a is a schematic flow chart of an embodiment of a method in a network node, of the present disclosure.

FIG. 4b is a schematic flow chart of another embodiment of a method in a network node, of the present disclosure.

FIG. 5a is a schematic flow chart of an embodiment of a method in a radio device, of the present disclosure.

FIG. 5b is a schematic flow chart of another embodiment of a method in a radio device, of the present disclosure.

FIG. 6 is a schematic block diagram illustrating an embodiment of an extended paging message of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
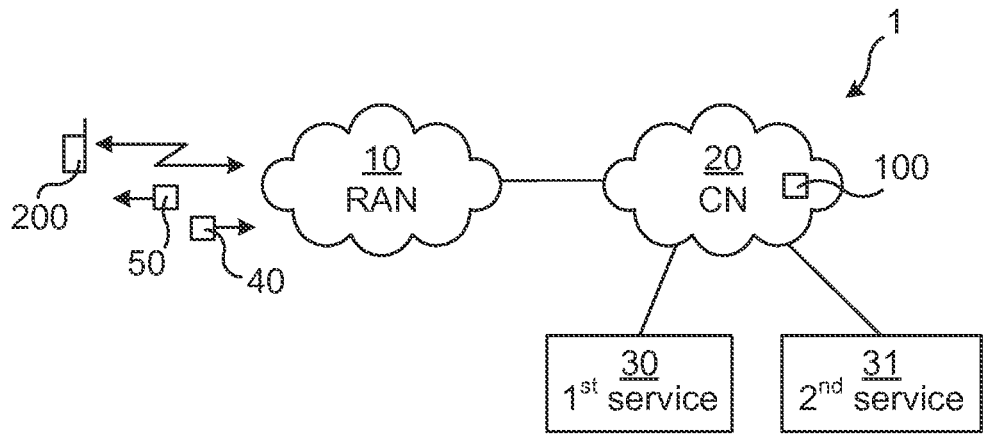
FIG. 1 is a schematic block diagram of an embodiment of a communication network in accordance with the present disclosure.

FIG. 1 schematically illustrates an embodiment of a radio communication network 1 in accordance with the present disclosure. A radio device 200 is connected to a core network (CN) 20 via a radio access network (RAN) 10, e.g. in accordance with a long term evolution (LTE) communication protocol. One or several services, here exemplified with a first service 30 and a second service 31 are associated with the communication network 1 e.g. via the Internet, and may be configured for sending and/or receiving information via messages to/from the radio device 200. An intermediary network node 100, as discussed herein, is part of the communication network 1. The network node 100 may e.g. reside in the CN 20, as indicated in the figure, e.g. integrated in a regular CN node. Alternatively, the network node 100 may reside in the RAN 10, e.g. integrated in a regular RAN node such as in a base station. The radio device 200 is configured to be able to send and receive radio messages via the RAN 10 over a radio interface. For instance, the radio device 200 may send an uplink (UL) message 40 towards the network node 100, comprising instruction to the network node 100. Similarly, the radio device 200 may receive a downlink (DL) message 50 in the form of the extended radio paging message 50 discussed herein.

Herein, the radio device 200 is exemplified by a mobile device, but stationary devices e.g. M2M sensors, are also contemplated. The radio device 200 may be any device, mobile or stationary, enabled to communicate over a radio cannel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC.

EXAMPLE 1

Delegation of Polling to an Intermediary Server 100

A mobile terminal 200 can delegate polling or other checking of different services 30, 31 to an intermediary server 100. Protocols to delegate authorization to connect to various services already exist today.

The sequence of steps is roughly as follows:

Step 1: The terminal 200 requests the intermediary server 100 to monitor a service, with service flag number set to i Step 2: request another service to be monitored (service flag number set to j) . . .

Step N: request the last service to be monitored (service flag number set to k)

Step N+1: monitoring by the intermediary server begins

The service flag numbers are needed when there is information from a service 30 or 31, and this needs to be indicated in an extended paging information channel. These numbers can be selected independently from each other, with the numbers being different or same for the different services.

It can be noted that the set of services polled may be selected by the radio terminal 200, or it may be predetermined e.g. all services are polled. This means that any information sent out in the extended paging information channel (see below) is general, and not tied to any applications of the terminal. This may be important, since applications often change rapidly, but network infrastructure should not require changes due to this.

The intermediary server 100 may be comprised in the network 1 of a mobile telecommunication operator network, e.g. in the core network (CN) 20, and not e.g. provided via the Internet, thus not provided by e.g. a third party service provider. The intermediary server may e.g. be associated with or comprised in a mobility management entity (MME) or a device connection platform (DCP) node, or in any CN node.

EXAMPLE 2

Extended Paging Information

The basic idea of this example is that instead of listing just the ID of the device that has incoming traffic, the paging message carries information about what specific service 30 or 31 (according to the intermediary 100) is available (e.g. has something to download). For instance, the paging message 50 could be extended to carry a few additional bits to indicate specific services:

bit 0: services with service flag number o have something to check (e.g., instant messaging, IM)

bit 1: services with service flag number 1 have something to check (e.g, e-mail or web update)

bit 2: services with service flag number 2 have something to check (e.g., firmware update for the device)

bit 3: there is an incoming IP packet (In a variation of this idea, some of the existing bits in the ID field are instead used for these indications.)

An extended paging message 50 may thus comprise standard ID and/or generic fields/bits as well as the additional bits for indicating whether some different services has something to send to the terminal.

The extended paging message may e.g. be handled by radio resource protocol software in the terminal 200.

EXAMPLE 3

Delegation of Wake-Up Decision to an Intermediary Server

An additional or alternative embodiment to the embodiment of Example 2 is to have the intermediary server 100 decide on behalf of the terminal 200 when it should be woken up. An advantage of this solution is that changes to the paging message can be avoided, and the radio network may be kept service agnostic.

The intermediary server 100 could reside, for example, in the Mobility Management Entity (MME), and the terminal 200 would be allowed to at anytime renegotiate the wake up rules with it. Thus, an operator may adjust the wake-up rules via a user interface (UI), either by pre-programming new rules or by making a choice when informed via the UI that there is data to download for a service. Alternatively, the terminal may rely on predefined rules for adjusting the wake-up rules, without the involvement of the operator. In case of a machine device, it might be more likely that a device connection management system, such as a Device Connection Platform (DCP) is used to reconfigure the wake-up rules in the intermediary server, if reconfiguration is needed. A further option is to have a DCP node act as or comprise the intermediary server.

In case an MME is used as/comprises the intermediary server 100, the data queues would naturally reside in the packet gateway (P-GW) or serving gateway (S-GW). However, other types of solutions where both control and user plane data are present in the same network node are possible.

EXAMPLE 4

Network Node

Figure 2A:
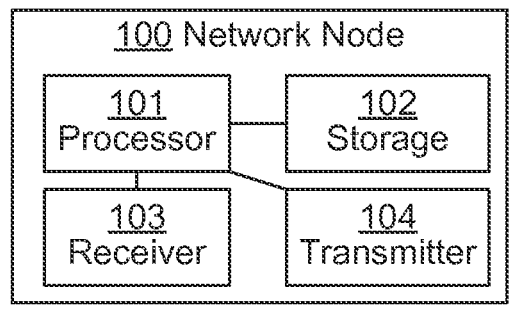
FIG. 2a is a schematic block diagram of an embodiment of a network node of the present disclosure.

FIG. 2a is a schematic block diagram illustrating an embodiment of a network node 100 (herein also called an intermediary server) of the present disclosure. The node 100 comprises a processor 101 e.g. a central processing unit (CPU). The processor 101 may comprise one or a plurality of processing units in the form of microprocessor(s). However, other suitable devices with computing capabilities could be comprised in the processor 101, e.g. an application specific integrated circuit (ASIC), a field programmable gate array (FPGA) or a complex programmable logic device (CPLD). The processor 101 is configured to run one or several computer program(s) or software stored in a storage unit 102 e.g. a memory. The storage unit is regarded as a computer readable means and may e.g. be in the form of a Random Access Memory (RAM), a Flash memory or other solid state memory, or a hard disk. The processor 101 is also configured to store data in the storage unit 102, as needed. The node 100 also comprises a transmitter 104 and a receiver 103, which may be combined to form a transceiver or be present as distinct units within the node 100. The transmitter 104 is configured to cooperate with the processor to produce a message to be transmitted over a radio interface to a radio device 200 in accordance with the radio access technology (RAT) used by the Radio Access Network (RAN) 10 via which the message is to be transmitted. The receiver 103 is configured to cooperate with the processor 101 to receive messages from the radio device 200. If the node 100 is integrated or otherwise associated with another network node, the processor 101 of the node 100 may also function as the processor of that other node, the storage unit 102 of the node 100 may also function as the storage unit of that other node, the transmitter 104 of the node 100 may also function as the transmitter of that other node, and/or the receiver 103 of the node 100 may also function as the receiver of that other node.

EXAMPLE 5

Radio Device

Figure 2B:
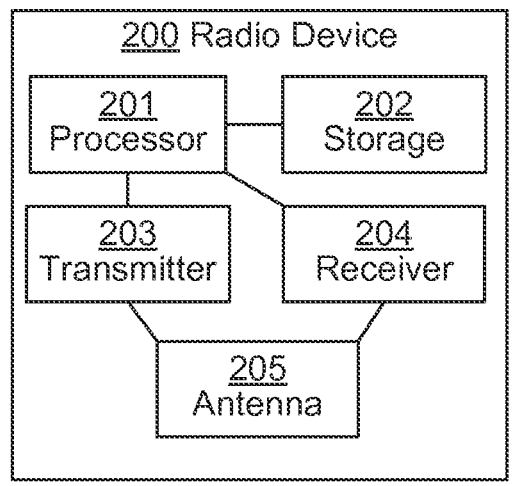
FIG. 2b is a schematic block diagram of an embodiment of a radio device of the present disclosure.

FIG. 2*b* is a schematic block diagram illustrating an embodiment of a radio device 200 of the present disclosure. The radio device 200 may be any type of radio device for wireless communication with a telecommunication network 1, such as with or via a radio base station (RBS), over a radio interface. Suitable communication devices include devices in accordance with Long Term Evolution (LTE), but other wireless communication standards, present or future, are also contemplated. The wireless communication device 200 may connect to a network, such as a Core Network (CN) 20, via any suitable RBS, and via any suitable Radio Access Technology (RAT). The radio device 200 comprises a processor 201, such as a central processing unit (CPU). The processor 201 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 201 is configured to run one or several computer program(s) or software stored in a storage unit 202, e.g. a memory. The storage unit is regarded as a computer readable means and may e.g. be in the form of a Random Access Memory (RAM), a Flash memory or other solid state memory, or a hard disk. The processor 201 is also configured to store data in the storage unit 202, as needed. The device 200 also comprises a transmitter 203, a receiver 204 and an antenna 205, which may be combined to form a transceiver or be present as distinct units within the device 200. The transmitter 203 is configured to cooperate with the processor 201 to transform data bits to be transmitted over a radio interface to a suitable radio signal in accordance with the RAT used by the RAN 10 via which the data bits are to be transmitted. The receiver 204 is configured to cooperate with the processor 201 to transform a received radio signal to data bits. The antenna 205 may comprise a single antenna or a plurality of antennas, e.g. for different frequencies and/or for MIMO (Multiple Input Multiple Output) communication. The antenna 205 is used by the transmitter 203 and the receiver 204 for transmitting and receiving, respectively, radio signals.

EXAMPLE 6

Computer Program Product

FIG. 3 illustrates a computer program product 300. The computer program product 300 comprises a computer readable medium 320 holding a computer program 310 in the form of computer-executable components 310. The computer program/computer-executable components 310 may be configured to cause a device, e.g. a network node 100 or a radio device 200 as discussed herein, to perform an embodiment of a method of the present disclosure. The computer program/computer-executable components may be run on the processing unit 101 or 201 of the device for causing the device to perform the method. The computer program product 300 may e.g. be comprised in the storage unit or memory 102 or 202 comprised in the device 100 or 200 and associated with the processing unit. Alternatively, the computer program product 300 may be, or be part of, a separate, e.g. mobile, storage means, such as a computer readable disc, e.g. CD or DVD or hard disc/drive, or a solid state storage medium, e.g. a RAM or Flash memory.

EXAMPLE 7

Method of a Network Node

FIG. 4*a* is a schematic flow chart of an embodiment of a method of a network node 100, according to the present disclosure. The node 100 receives 401 instructions to monitor whether a first service 30 is sending a message intended for the radio device 200. Optionally, the node 100 also receives 401 instructions to monitor whether a second service 31 is sending a message intended for the radio device 200. Further, the node 100 monitors 402 the service(s) in accordance with the received instructions, in order to obtain information relating to whether the service(s) is sending a message intended for the radio device. The node also processes 403 the obtained information such that a decision can be made whether to wake up the radio device.

FIG. 4*b* is a schematic flow chart of another embodiment of a method of a network node 100, according to the present disclosure. The method steps 401, 402 and 403 discussed above are also part of the embodiment of FIG. 4*b*. Additionally, the network node 100 decides 404 whether to wake up the radio device 200 based on the processed 403 information. Thus, according to this embodiment, the network node makes the decision on whether to wake up the radio device, not the radio device 200 itself. The network node 10 may then produce 405 an extended radio paging message 50 comprising bits dedicated to indicate whether the first service 30 to which the bits are dedicated requests to send a message to the radio device 200. The extended paging message 50 may then be sent 406 towards the radio device 200.

EXAMPLE 8

Method of a Radio Device

FIG. 5*a* is a schematic flow chart of an embodiment of a method of a radio device 200, according to the present disclosure. The device 200 sends 501, to the network node 100, instructions 40 to monitor whether a first service 30 is sending a message intended for the radio device 200. Optionally, the device 200 also sends 501, to the network node 100, instructions 40 to monitor whether a second service 31 is sending a message intended for the radio device 200. In accordance with the instructions, the monitoring is to be performed in order to obtain information relating to whether the service(s) is sending a message intended for the radio device 200. The radio device 200 also sends 502, to the network node 100, instructions 40 for processing the obtained information such that a decision can be made whether to wake up the radio device 200.

FIG. 5b is a schematic flow chart of another embodiment of a method of a radio device 200, according to the present disclosure. The method steps 501 and 502 discussed above are also part of the embodiment of FIG. 5b. Additionally, according to the embodiment of FIG. 5b, the radio device 200 receives 503 an extended radio paging message 50 comprising bits dedicated to indicate that the first service 30 to which the bits are dedicated requests to send a message to the radio device 200. Based on the received 503 extended paging message 50, the radio device 200 may then decide 505 whether to wake up (e.g. switch from an idle mode to an active mode) to be able to receive the message from the service 30 or 31. The radio device may then receive the message from the service 30 or 31, if it has decided 505 to wake up. The radio device 200 may also obtain 504 information about a status of the radio device 200 (e.g. remaining energy stored in a battery comprised in the radio device 200 and/or remaining free storage space in the radio device 200). The deciding 505 whether to wake up the radio device may then be based also on the obtained 504 status information.

EXAMPLE 9

Extended Radio Paging Message

FIG. 6 schematically illustrates an embodiment of an extended radio paging message 50 of the present disclosure. The paging message 50 comprises bits 51 dedicated to indicate whether a first service 30, second service 31 or other service(s) to which the bits are dedicated requests to send a message to a radio device 200. Thus, the extended radio paging message 50 comprises at least one bit 51 dedicated to indicate whether a first service 30 to which the bit is dedicated requests to send a message to a radio device 200.

Below follow some other aspects of the present disclosure.

According to an aspect of the present disclosure, there is provided a network node 100 in a communication network 1. The network node comprises means 101 and 103 for receiving 401 instructions to monitor whether a first service 30 is sending a message intended for a radio device 200. The network node also comprises means 101 for monitoring 402 the first service 30, in accordance with the received 401 instructions, in order to obtain information relating to whether the service is sending a message intended for the radio device 200. The network node also comprises means 101 for processing 403 the obtained information such that a decision can be made whether to wake up the radio device 200.

According to another aspect of the present disclosure, there is provided a radio device 200. The radio device comprises means 201, 203 and 205 for sending 501, to a network node 100, instructions 40 to monitor a first service 30 in order to obtain information relating to whether the first service is sending a message intended for the radio device 200. The radio device also comprises means 201, 203 and 205 for sending 502, to the network node 100, instructions 40 for processing the obtained information such that a decision can be made whether to wake up the radio device 200.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a network node in a communication network, the method comprising:
   receiving instructions to monitor whether a first service is sending a message intended for a radio device;
   monitoring the first service, in accordance with the received instructions, in order to obtain information relating to whether the first service is sending a message intended for the radio device;
   receiving instructions to monitor whether a second service is sending a message intended for a radio device;
   monitoring the second service, in accordance with the received instructions, in order to obtain information relating to whether the second service is sending a message intended for the radio device;
   processing the obtained information of the first service and the second service;
   producing an extended radio paging message comprising bits dedicated to the first service and further comprising bits dedicated to the second service, indicating that the first service and the second service to which the bits are dedicated request to send a message to the radio device; and
   sending the extended radio paging message for the radio device for enabling the radio device to decide whether to wake up based on the extended radio paging message.

2. The method of claim 1, wherein receiving instructions further comprises receiving instructions from the radio device.

3. The method of claim 1, further comprising:
   deciding whether to wake up the radio device based on the processed information.

4. The method of claim 1, wherein the network node is part of a mobile telecommunication operator network.

5. The method of claim 1, wherein the network node is associated with or comprised in a mobility management entity (MME) or in any other core network (CN) node; or in a base station or other Radio Access Network (RAN) node.

6. The method of claim 1, wherein the message intended for the radio device is a request or a data message.

7. A computer program product comprising computer-executable components for causing a network node to perform the method of claim 1, when the computer-executable components are run on a processor comprised in the network node.

8. A network node in a communication network, the network node comprising:
   a processor; and
   a storage unit storing instructions that when executed by the processor cause the network node to:
   monitor a first service in order to obtain information relating to whether the first service is sending a message intended for a radio device;
   monitor a second service in order to obtain information relating to whether the second service is sending a message intended for the radio device;
   process the obtained information of the first service and the second service;
   produce an extended radio paging message comprising bits dedicated to the first service and further comprising bits dedicated to the second service, indicating that the first service and the second service to which the bits are dedicated request to send a message to the radio device; and send the extended radio paging message for the radio device for enabling the radio device to decide whether to wake up based on the extended radio paging message, wherein the network node is configured for performing the monitoring as a result of the network node having received instructions to monitor whether the first service and the second service is sending a message intended for the radio device.

9. A computer program for a network node comprising computer program code which, when run on a processor of the network node, causes the node to:

receive instructions to monitor whether a first service is sending a message intended for a radio device;

monitor the first service, in accordance with the received instructions, in order to obtain information relating to whether the service is sending a message intended for the radio device;

receive instructions to monitor whether a second service is sending a message intended for a radio device;

monitor the second service in accordance with the received instructions, in order to obtain information relating to whether the service is sending a message intended for the radio device;

process the obtained information of the first service and the second services;

produce an extended radio paging message comprising bits dedicated to the first service and further comprising bits dedicated to the second service, indicating that the first service and the second service to which the bits are dedicated request to send a message to the radio device; and send the extended radio paging message for the radio device for enabling the radio device to decide whether to wake up based on the extended radio a paging message.

10. A computer program product comprising a computer program according to claim 9 and a non-transitory computer readable means on which the computer program is stored.

11. A method performed in a radio device, the method comprising:

sending, to a network node, instructions to monitor a first service in order to obtain information relating to whether the first service is sending a message intended for the radio device;

sending, to the network node, instructions to monitor a second service in order to obtain information relating to whether the second service is sending a message intended for the radio device;

sending, to the network node, instructions for processing the obtained information of the first service and the second service;

receiving an extended radio paging message comprising bits dedicated to the first service and further comprising bits dedicated to the second service, indicating that the first service and the second service to which the bits are dedicated request to send a message to the radio device enabling the radio device to decide whether to wake up based on the extended radio paging message.

12. The method of claim 11, further comprising:
deciding whether to wake up based on the received extended radio paging message.

13. The method of claim 12, further comprising:
obtaining information about a status of the radio device, wherein the deciding whether to wake up is further based on the obtained status information.

14. The method of claim 13, wherein the status comprises at least one of remaining energy stored in a battery comprised in the radio device, and remaining free storage space in the radio device.

15. A computer program product comprising computer-executable components for causing a radio device to perform the method according to claim 11, when the computer-executable components are run on a processor comprised in the radio device.

16. A radio device, comprising:
a processor, and
a storage unit storing instructions that, when executed by the processor, cause the radio device to:
send, to a network node, instructions to monitor a first service in order to obtain information relating to whether the first service is sending a message intended for the radio device;
send, to a network node, instructions to monitor a second service in order to obtain information relating to whether the second service is sending a message intended for the radio device;
send, to the network node, instructions for processing the obtained information of the first service and the second service; and
receive, from the network node, an extended radio paging message comprising bits dedicated to the first service and further comprising bits dedicated to the second service, indicating that the first service and the second service to which the bits are dedicated request to send a message to the radio device enabling the radio device to decide whether to wake up based on the extended radio paging message.

17. A computer program for a radio device comprising computer program code which is able to, when run on a processor of the radio device, cause the radio device to:
send, to a network node, instructions to monitor a first service in order to obtain information relating to whether the first service is sending a message intended for the radio device;
send, to a network node, instructions to monitor a second service in order to obtain information relating to whether the second service is sending a message intended for the radio device;
send, to the network node, instructions for processing the obtained information of the first service and the second service; and
receive, from the network node, an extended radio paging message comprising bits dedicated to the first service and further comprising bits dedicated to the second service, indicating that the first service and the second service to which the bits are dedicated request to send a message to the radio device enabling the radio device to decide whether to wake up based on the extended radio paging message.

18. A computer program product comprising the computer program of claim 17 and a non-transitory computer readable means on which the computer program is stored.

* * * * *